US009892577B2

(12) United States Patent
Zheng et al.

(10) Patent No.: US 9,892,577 B2
(45) Date of Patent: Feb. 13, 2018

(54) LED LIGHTING DEVICE, LED LIGHTING SYSTEM, AND METHOD FOR CONTROLLING THEREOF

(71) Applicant: SENGLED OPTOELECTRONICS CO., LTD., Tongxiang (CN)

(72) Inventors: Jianbing Zheng, Tongxiang (CN); Chaoqun Sun, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 26 days.

(21) Appl. No.: 15/027,009

(22) PCT Filed: Jun. 29, 2015

(86) PCT No.: PCT/CN2015/082637
§ 371 (c)(1),
(2) Date: Apr. 4, 2016

(87) PCT Pub. No.: WO2016/074485
PCT Pub. Date: May 19, 2016

(65) Prior Publication Data
US 2016/0328896 A1 Nov. 10, 2016

(30) Foreign Application Priority Data

Nov. 10, 2014 (CN) .......................... 2014 1 0629581

(51) Int. Cl.
*G07C 9/00* (2006.01)
*G06K 9/00* (2006.01)
(Continued)

(52) U.S. Cl.
CPC ..... *G07C 9/00158* (2013.01); *G06K 9/00255* (2013.01); *G06K 9/00288* (2013.01);
(Continued)

(58) Field of Classification Search
CPC .. G06K 9/00255; G06K 9/00288; G07C 9/00; G07C 9/00158; G07C 9/00563;
(Continued)

(56) References Cited

U.S. PATENT DOCUMENTS 8,780,201 B1 * 7/2014 Scalisi ................... H04N 7/186
348/143
2013/0283399 A1 * 10/2013 Uchida ................. H04L 67/025
726/29

FOREIGN PATENT DOCUMENTS

CN 102747891 A 10/2012
CN 103106763 A 5/2013
(Continued)

OTHER PUBLICATIONS

The World Intellectual Property Organization (WIPO) International Search Report for PCT/CN dated Sep. 11, 2015.

*Primary Examiner* — Yong Hang Jiang
(74) *Attorney, Agent, or Firm* — Anova Law Group, PLLC (57) ABSTRACT

The present disclosure provides an LED lighting device, and the related smart access control systems and methods. The LED lighting device may be installed outside an entrance door and include an LED light-emitting module, a lighting controller, an image acquisition module and a wireless communication module. The image acquisition module is configured to collect a facial image of a person outside the entrance door, and send the collected facial image to the lighting controller. The lighting controller is configured to control the LED light-emitting module to emit light, and send the facial image to the wireless communication module. The wireless communication module is configured to send the facial image to a server. The server matches the facial image with user pre-stored facial feature templates and sends an instruction to open the entrance door when a
(Continued)

successful match is found. The LED lighting device and the server form a smart access control system.

17 Claims, 6 Drawing Sheets

(51) Int. Cl.
*H05B 33/08* (2006.01)
*H05B 37/00* (2006.01)

(52) U.S. Cl.
CPC ........... *G07C 9/00* (2013.01); *G07C 9/00563* (2013.01); *G07C 9/00571* (2013.01); *G07C 9/00944* (2013.01); *H05B 33/0845* (2013.01); *H05B 33/0854* (2013.01); *H05B 37/00* (2013.01)

(58) Field of Classification Search
CPC ........... G07C 9/00571; G07C 9/00944; H05B 33/0845; H05B 33/0854; H05B 37/00
USPC ........................................................ 340/5.53
See application file for complete search history.

(56) References Cited

FOREIGN PATENT DOCUMENTS

| | | |
|---|---|---|
| CN | 104361664 A | 2/2015 |
| JP | 2007258953 A | 10/2007 |
| WO | 2008133458 A1 | 11/2008 |

* cited by examiner

LED LIGHTING DEVICE, LED LIGHTING SYSTEM, AND METHOD FOR CONTROLLING THEREOF

CROSS-REFERENCES TO RELATED APPLICATIONS

This application is a national stage application under 35 USC §371(c) of PCT Application No. PCT/CN2015/082637, entitled "LED Lighting Device, LED Lighting System, and Method for Controlling Thereof," filed on Jun. 29, 2015, which claims the priority of Chinese Patent Application No. 201410629581.5, filed on Nov. 10, 2014. The entire disclosure and contents of the above applications are hereby incorporated by reference herein.

FIELD OF THE DISCLOSURE

The present disclosure generally relates to the field of smart lighting and access control technologies and, more particularly, relates to an LED lighting device, an LED lighting system, and a method for controlling thereof.

BACKGROUND

LED (Light Emitting Diode) is a solid state semiconductor device that can directly convert electrical energy to visible light. LED technologies provide many advantages in energy conservation, environmental protection, controllable lighting, being highly practical, and providing high stability, short response time, and long operational lifetime, etc. To promote low carbon living and protect environment, LED technologies have been widely adopted in various lighting applications. LED lighting fits well into the developing trend of highly efficient and environmental friendly lighting. Further, LED lighting enables unique power supply and control methods, which provide technological foundations for integrating various intelligent control and multimedia functions.

Overtime, people have higher and higher requirements for home security. One approach is using a conventional door lock at an entrance door as an anti-theft measure. However, traditional approaches have become less effective overtime and often cannot meet users' security and anti-theft requirements.

The disclosed method and system for audio broadcast are directed to solve one or more problems set forth above and other problems in the art.

BRIEF SUMMARY OF THE DISCLOSURE

One aspect of the present disclosure provides an LED lighting device. The LED lighting device may include an LED light-emitting module; an image acquisition module configured to collect a facial image of a person in an area illuminated by the LED lighting device, and send the facial image to a lighting controller; a lighting controller configured to control the LED light-emitting module to emit light, and send the facial image to a wireless communication module; and a wireless communication module configured to send the facial images to a server. The server may match the facial image with user pre-stored facial feature templates and send an instruction to open an entrance door when a successful match is found.

Another aspect of the present disclosure provides a smart access system includes an LED lighting device. The LED lighting device may include an LED light-emitting module, a lighting controller, an image acquisition module and a wireless communication module. The server may include a facial image receiving module, a facial image matching module and an access control instruction sending module. Further, the image acquisition module is configured to collect a facial image of a person, and send the collected facial image to the lighting controller. The lighting controller is configured to control the LED light-emitting module to emit light, and send the facial image to the wireless communication module. The wireless communication module is configured to send the facial image to the server. The facial image receiving module is configured to receive the facial image through the wireless communication module. The facial image matching module is configured to match the facial image with user pre-stored facial feature templates. The access control instruction sending module is configured to send a door-opening instruction to an entrance door when a successful match is found.

Another aspect of the present disclosure provides an access control method. The method may install an LED lighting device outside an entrance door, wherein the LED lighting device includes an LED light-emitting module, a lighting controller, an image acquisition module and a wireless communication module. The image acquisition module may collect a facial image of a person outside the entrance door and send the facial image to the lighting controller. The lighting controller may send the facial image to the wireless communication module. The wireless communication module may send the facial image to a server. Further, the server may match the facial image with user pre-stored facial feature templates and send an instruction to open the entrance door when a successful match is found.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
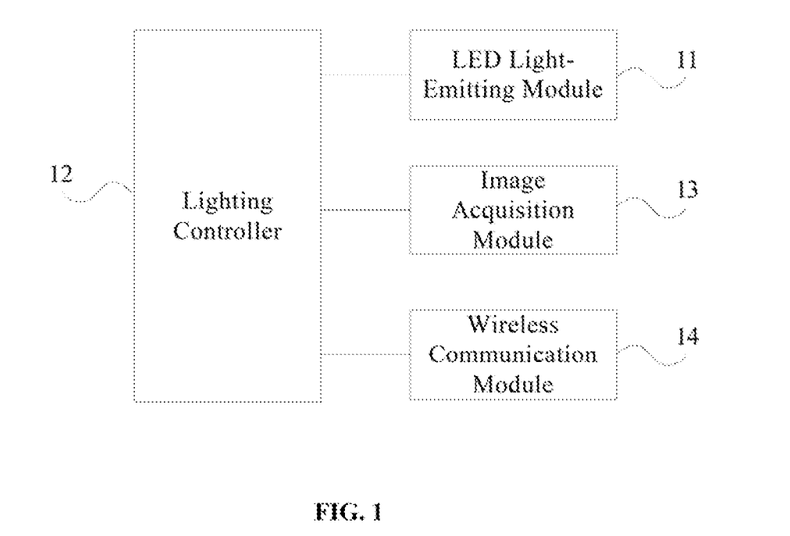
FIG. 1 is a schematic diagram illustrating a first exemplary LED lighting device consistent with various embodiments of the present disclosure.

FIG. 1 is a schematic diagram illustrating a first exemplary LED lighting device consistent with various embodiments of the present disclosure. As shown in FIG. 1, the first exemplary LED lighting device may be installed outside an entrance door, such as a house entrance door or an office entrance door.

The first exemplary LED lighting device may include an LED light-emitting module 11, a lighting controller 12, an image acquisition module 13 and a wireless communication module 14. The LED light-emitting module 11 provides illumination for a work space or a living space.

The image acquisition module 13 may be configured to collect facial images of people outside the entrance door, and send the collected facial images to the lighting controller 12.

The lighting controller 12 may be configured to control the LED light-emitting module 11 to emit light, and to send the facial images to the wireless communication module 14.

The wireless communication module 14 may be configured to send the facial images to a server. The server may match the facial images with facial feature templates pre-stored by users, and send an instruction to open the entrance door when the match is successful.

In certain embodiments, the image acquisition module 13 may use a camera. The wireless communication module 14 may be a W-FI module.

Further, existing LED lighting devices may include the lighting controller 12 and the LED light-emitting module 11. The lighting controller 12 may control the LED light-emitting module 11 to turn on, turn off, change brightness and/or colors, etc. In various embodiments, in order to combine an existing LED lighting device and an online server to form a smart access control system, the first exemplary LED lighting device may integrate the image acquisition module 13 and the wireless communication module 14. Both modules may be connected to the lighting controller 12 so that the image acquisition module 13 and the wireless communication module 14 may be controlled by the lighting controller 12.

In an exemplary embodiment, the image acquisition module 13 may collect a facial image from a person outside the entrance door and send the facial image to the lighting controller 12. While controlling the lighting of the LED light-emitting module 11, the lighting controller 12 may also send the collected facial image to the wireless communication module 14. The wireless communication module 14 may send the facial image to the server. Users may pre-configure and pre-store facial feature templates of persons who are allowed for entrance to the server. When the server receives the facial image sent by the wireless communication module 14, the server may match the facial image with the user pre-stored facial feature templates, and send an instruction to open the entrance door when the match is successful. Thereafter, the entrance door may be opened.

Using home access control as an example, a home user may upload facial feature templates of the user's family members to the server. When the father of the family gradually approaches the entrance door, the image acquisition module 13 may collect facial images of the father. The wireless communication module 14 may send the collected facial images to the server. The server may perform preprocessing and feature extraction on the facial image, and match with pre-stored facial feature templates of all family members one by one. The server may first compare the facial image with a pre-stored facial feature template of the mother and determine that their similarity rate is lower than a preset match threshold value (e.g., 80%). The server may then compare the facial image with a pre-stored facial feature template of the farther and determine their similarity rate is high (e.g., 90%) which exceeds the preset match threshold 80%. The server may then send an instruction to open the entrance door. It should be understood that, the value of the match threshold is only for illustrative purposes and may be customized according to users' security needs.

In one embodiment, the server may directly send an unlock instruction to a smart lock of the entrance door so that the entrance door can be directly opened. In another embodiment, the server may send the instruction of opening the entrance door to a user's mobile terminal. The mobile terminal may interact with a smart lock through an APP ("Application"), and control the opening of the entrance door.

In various embodiments, the first exemplary LED lighting device outside the entrance door may include an image acquisition module and a wireless communication module. A lighting controller of the LED lighting device may control the image acquisition module and the wireless communication module. The image acquisition module may send a collected facial image to the lighting controller. The lighting controller may send the collected facial image to a server through the wireless communication module. The server may implement facial recognition technologies, match the collected facial image with pre-stored facial feature templates, and send an instruction to open the entrance door when the match is successful. The first exemplary LED lighting device and the server may form a smart system for controlling an entrance door. Comparing to using conventional door locks as an anti-theft measure, the smart system may increase security and intelligent levels of houses.

Figure 2:
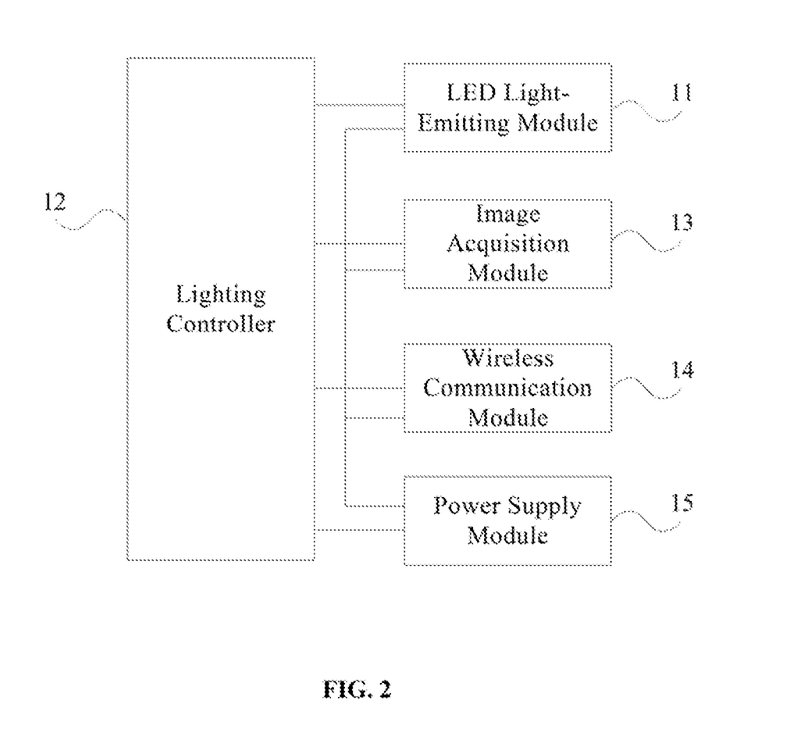
FIG. 2 is a schematic diagram illustrating a second exemplary LED lighting device consistent with various embodiments of the present disclosure.

FIG. 2 is a schematic diagram illustrating a second exemplary LED lighting device consistent with various embodiments of the present disclosure. As shown in FIG. 2, on the basis of the first exemplary LED lighting device shown in FIG. 1, the second exemplary LED lighting device may further include a power supply module 15. The power supply module 15 may connect to the lighting controller 12, the LED light-emitting module 11, the image acquisition module 13 and the wireless communication module 14.

The power supply module 15 may be configured to obtain alternative current (AC) signals from a utility line, convert the AC signals to four direct current (DC) signals, and send the four DC signals to the lighting controller 12, the LED light-emitting module 11, the image acquisition module 13 and the wireless communication module 14 correspondingly.

Further, in existing LED lighting devices, the power supply module 15 may only need to provide power to the LED light-emitting module 11 and the lighting controller 12. In various embodiments, the power supply module 15 may provide power to the image acquisition module 13 and the wireless communication module 14 integrated in the second exemplary LED lighting device. The power supply module 15 may be configured to obtain alternative current (AC) signals from a utility line, convert the AC signals to four direct current (DC) signals. Voltages of the four DC signals may respectively accommodate working voltages of the four modules, i.e. the lighting controller 12, the LED light-emitting module 11, the image acquisition module 13, and the wireless communication module 14. Further, the power supply module 15 may send the four DC signals to the lighting controller 12, the LED light-emitting module 11, the image acquisition module 13, and the wireless communication module 14 correspondingly.

On the basis of the first exemplary LED lighting device, the second exemplary LED lighting device may improve an existing power supply module. The power supply module may provide power supply not only to a lighting controller and an LED light-emitting module, but also to an image acquisition module and a wireless communication module integrated into the second exemplary LED lighting device, which ensures normal operation of the second exemplary LED lighting device.

Figure 3:
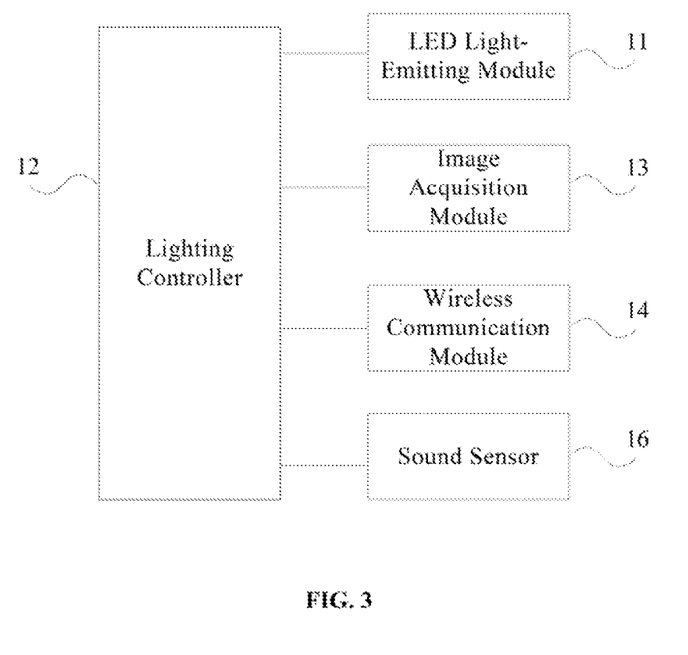
FIG. 3 is a schematic diagram illustrating a third exemplary LED lighting device consistent with various embodiments of the present disclosure.

FIG. 3 is a schematic diagram illustrating a third exemplary LED lighting device consistent with various embodiments of the present disclosure. As shown in FIG. 3, on the basis of the first exemplary LED lighting device shown in FIG. 1, the third exemplary LED lighting device may further include a sound sensor 16 configured to detect sound outside an entrance door, and send light control instructions to the lighting controller 12 when the detected sound exceeds a preset threshold.

Correspondingly, the lighting controller 12 may be further configured to control the image acquisition module 13 to turn on according to the light control instructions.

In an exemplary embodiment, the third exemplary LED lighting device may implement voice-activated lighting by integrating the sound sensor 16. The sound sensor 16 may detect sound outside the entrance door, and send light control instructions to the lighting controller 12 when the detected sound exceeds a preset threshold.

In one embodiment, the image acquisition module 13 may always be on. In another embodiment, the image acquisition module 13 may often be turned off. In order to save energy, the image acquisition module 13 may normally be off and may be turned on when someone is approaching (e.g. when the detected sound exceeds a preset threshold). Correspondingly, while controlling the LED light-emitting module 11 to light up, the lighting controller 12 may also activate the image acquisition module 13 according to the light control instructions (e.g., turning the image acquisition module 13 off when turning the LED light-emitting module 11 off). Further, the LED light-emitting module 11 may light up nearby areas of the entrance door, which allow the image acquisition module 13 to collect clearer facial images, and enhances facial recognition accuracy.

Figure 4:
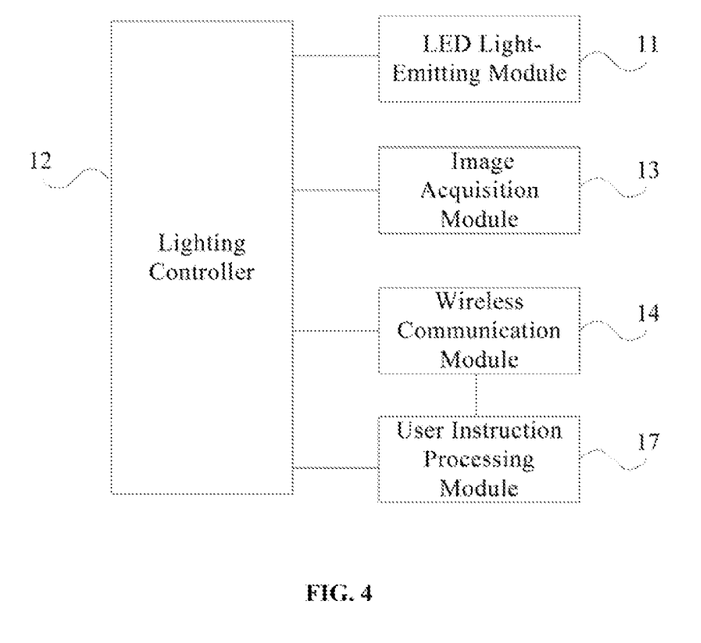
FIG. 4 is a schematic diagram illustrating a forth exemplary LED lighting device consistent with various embodiments of the present disclosure.

FIG. 4 is a schematic diagram illustrating a fourth exemplary LED lighting device consistent with various embodiments of the present disclosure. As shown in FIG. 4, on the basis of the first exemplary LED lighting device shown in FIG. 1, the fourth exemplary LED lighting device may further include a user instruction processing module 17 configured to receive a user control instruction from a mobile terminal of an indoor user through the wireless communication module 14, and to send the user control instruction to the lighting controller 12. The user control instruction may be sent after the indoor user hears a doorbell ringing.

Correspondingly, the lighting controller 12 may be further configured to control the image acquisition module 13 to start according to the user control instruction.

Comparing to various embodiments according to FIG. 3, an exemplary embodiment according to FIG. 4 may provide another application scenario, and another option to activate the image acquisition module 13 in the application scenario. Further, the exemplary embodiment may be applied to a scenario when an owner is inside the house and there is someone outside ringing the doorbell. When the owner/user hears the doorbell inside the house, the owner may use the mobile terminal to wirelessly communicate with the wireless communication module 14, thereby send a user control instruction to the user instruction processing module 17. Further, the user instruction processing module 17 may send the user control instruction to the lighting controller 12 which may follow the user instruction and turn on the image acquisition module 13. In an exemplary implementation, the user may install a control program/APP on the mobile terminal. The user may interact with the LED lighting device through the program/APP, thereby activating the image acquisition module 13.

Figure 5:
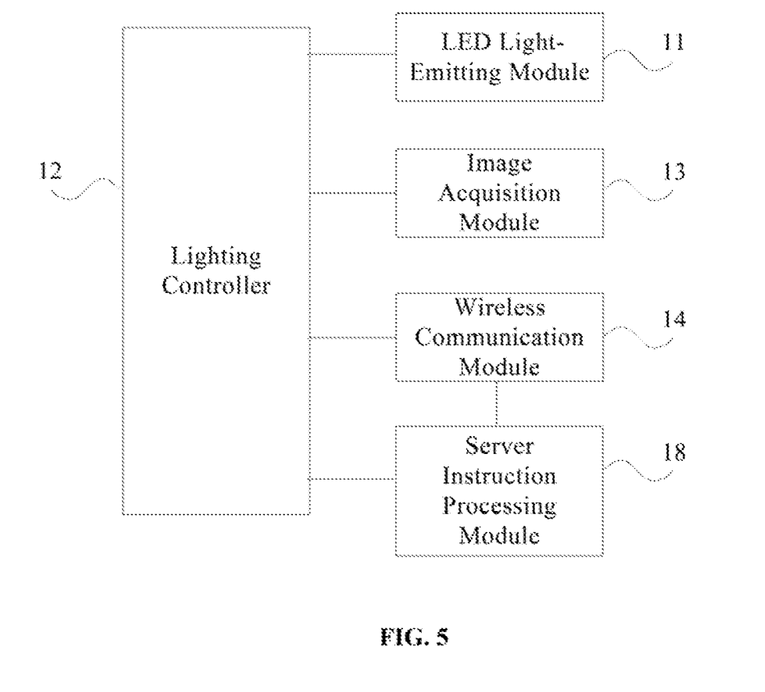
FIG. 5 is a schematic diagram illustrating a fifth exemplary LED lighting device consistent with various embodiments of the present disclosure.

FIG. 5 is a schematic diagram illustrating a fifth exemplary LED lighting device consistent with various embodiments of the present disclosure. As shown in FIG. 5, on the basis of the first exemplary LED lighting device shown in FIG. 1, the fifth exemplary LED lighting device may further include a server instruction processing module 18 configured to receive a server control instruction from a server through the wireless communication module 14, and to send the server control instruction to the lighting controller 12. The server control instruction may include an access control activation time.

Correspondingly, the lighting controller 12 may be further configured to activate the image acquisition module 13 when the access control activation time is reached.

Comparing to various embodiments according to FIG. 3 or FIG. 4, an exemplary embodiment according to FIG. 5 may provide another way to activate the image acquisition module 13. That is, the server may control the activation time period of the image acquisition module 13. In one embodiment, the server may receive an access control activation time from a user mobile terminal. In another embodiment, the server may perform statistical analysis on users' behavior and habits to determine an access control activation time based on results of the statistical analysis. The server may send a server control instruction to the server instruction processing module 18 through the wireless communication module 14. The server instruction processing module 18 may send the server control instruction to the lighting controller 12. The server control instruction may include the access control activation time. The lighting controller 12 may turn on the image acquisition module 13 when the access control activation time is reached. The access control activation times may be set according to a daily or weekly schedule.

In an exemplary embodiment, the lighting controller 12 may be further configured to selectively send facial images collected by the image acquisition module 13 to the server. Further, after the image acquisition module 13 sends images outside the entrance door to the lighting controller 12, the lighting controller 12 may be configured to determine whether such images have changed or not. Under normal circumstances, when no one is entering a detection range of the image acquisition module 13, images collected by the image acquisition module 13 may be the same (or substantially the same). When someone enters the detection range, the images collected by the image acquisition module 13 may change. Accordingly, once detecting whether the images collected by the image acquisition module 13 are changed, the lighting controller 12 may determine whether to send the images to the server for facial image matching. This process may save data communication resources between the LED lighting device and the server.

Figure 6:
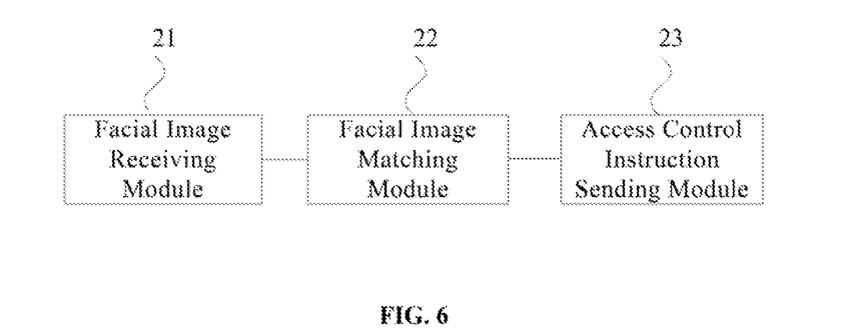
FIG. 6 is a schematic diagram illustrating a first exemplary server consistent with various embodiments of the present disclosure.

FIG. 6 is a schematic diagram illustrating a first exemplary server consistent with various embodiments of the present disclosure. As shown in FIG. 6, the first exemplary server may be configured to work together with the exemplary LED lighting device shown in FIG. 1. The exemplary server may include a facial image receiving module 21, a facial image matching module 22, and an access control instruction sending module 23.

The facial image receiving module 21 may be configured to receive facial images sent from a wireless communication module of the LED lighting device. The LED lighting device may be installed outside an entrance door. The facial images may be facial images of persons outside the entrance door collected by an image acquisition module of the LED lighting device.

The facial image matching module 22 may be configured to match the facial images with the facial feature templates pre-stored by users.

The access control instruction sending module 23 may be configured to send a door-opening instruction to the entrance door when the facial image matching is successful.

In an exemplary embodiment, users may pre-configure and pre-store facial feature templates of persons allowed for entrance in the server. When the facial image receiving module 21 receives a facial image sent by the wireless communication module, the facial image matching module 22 may match the facial image with the user pre-stored facial feature templates. When a successful match is found, the access control instruction sending module 23 may send an instruction to open the entrance door. Therefore, the entrance door may be opened.

In certain embodiments, the facial image matching module 22 may be configured to perform preprocessing and feature extraction on the facial image, and compare processed facial images with pre-stored facial feature templates one by one. When a similarity rate between the processed facial image and a pre-stored facial feature template is lower than a preset match threshold, the facial image matching module 22 may determine that the images do not match. When the similarity rate is higher than the preset match threshold, the facial image matching module 22 may determine that a successful match is found. After the successful match is determined, the access control instruction sending module 23 may send an instruction to open the entrance door.

Optionally, in one embodiment, when the facial image matching module 22 determines that no match is found for the facial image, the server may send a warning message to a user's mobile terminal.

In another embodiment, when the facial image matching module 22 determines that no match is found for the facial image and further determines the facial image occurs multiple times during a short time period, the server may send a warning message to a user's mobile terminal and/or directly call a preset police phone number.

In an exemplary embodiment, when the lighting controller of the LED lighting device sends a collected facial image to the exemplary server through the wireless communication module, the server may implement facial recognition technologies, match the collected facial image with pre-stored facial feature templates, and send an instruction to open the entrance door when a successful match is found. The LED lighting device and the exemplary server may form a smart system for controlling an entrance door. Comparing to using conventional door locks as anti-theft measure, the smart system may increase security and intelligent levels of houses.

Figure 7:
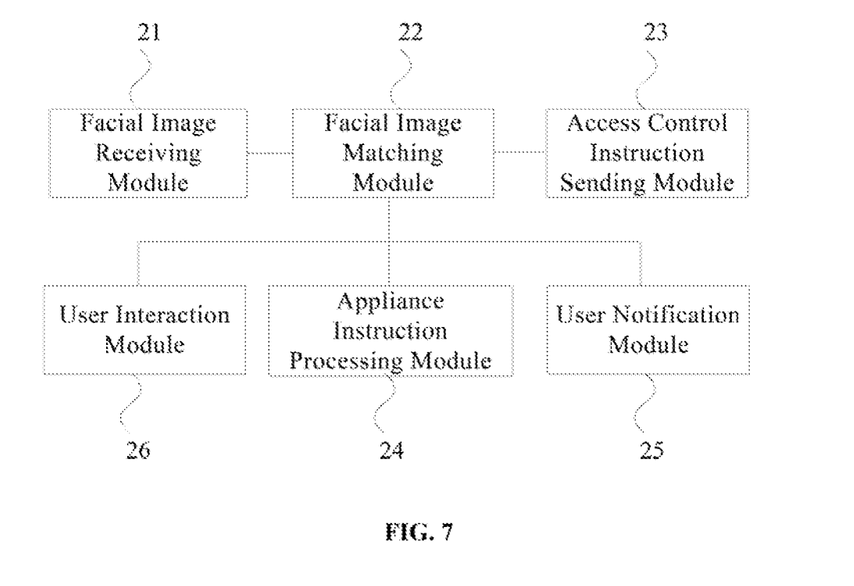
FIG. 7 is a schematic diagram illustrating a second exemplary server consistent with various embodiments of the present disclosure.

FIG. 7 is a schematic diagram illustrating a second exemplary server consistent with various embodiments of the present disclosure. As shown in FIG. 7, on the basis of the first exemplary server shown in FIG. 6, the second exemplary server may further include an appliance instruction processing module 24, a user notification module 25, and/or a user interaction module 26.

The appliance instruction processing module 24 may be configured to send an activation instruction to an appliance inside the entrance door when the facial image match is successful.

The user notification module 25 may be configured to send a notification to a user's mobile terminal about a child arriving the house, when the facial image successfully matches a pre-stored facial feature template of the child.

The user interaction module 26 may be configured to send a facial image to the user's mobile terminal when no match is found, and receive feedback information from the mobile terminal. Further, when the feedback information is granting access, the server may instruct the entrance door to open.

In an exemplary embodiment, when the exemplary server determines that a family member is entering the house, the appliance instruction processing module 24 may send control instructions to electrical appliances inside the entrance door. Therefore, the electrical appliances in the house may be adjusted to a preset working mode, which creates a smart home living experience. Users may customize the preset working modes according to personal needs. For example, mode 1 may include: turning on a living room light, activating a cooling mode of an air-conditioner, closing electrical shades/curtain, etc. In another example, mode 2 may include: turning on a living room light and a study room light, activating a heating mode of an air conditioner, and turning on speakers, etc.

Further, when determining a child is entering after the face matching process, the exemplary server may send a notification to the user through the user notification module 25 that the child has arrived home. In certain embodiments, the mobile terminal may be a mobile phone owned by a father and/or a mother in the family. In this way, parents may know when their kids get home, which enhances security controls for family members.

In addition, users may generally pre-store limited facial feature templates on the server. Therefore, when a guest visits the place but his/her facial feature template is not pre-stored, no match would be found and the exemplary server may not directly send a door-opening instruction to the entrance door. The exemplary server may provide a user interaction module 26. The user interaction module 26 may send a facial image to the user's mobile terminal when no match is found. Whether being at home or not, the user may conveniently decide whether the guest is an allowed visitor on the mobile terminal, and send feedback information through the mobile terminal to the server. When receiving the feedback information from the user's mobile terminal, the user interaction module 26 may determine whether to allow the guest to enter or not according to the feedback information. When the feedback information is granting access, the user interaction module 26 may send a door-opening instruction to the entrance door.

Figure 8:
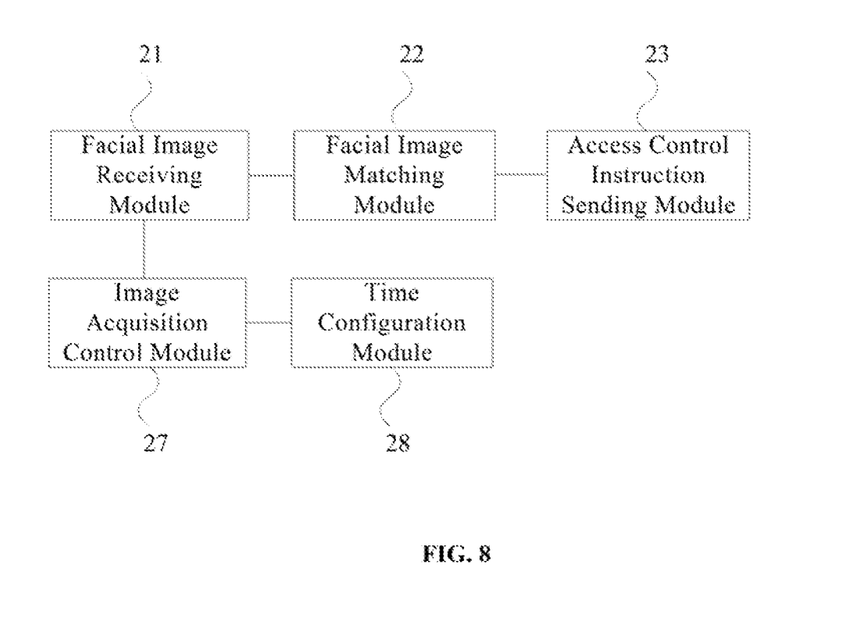
FIG. 8 is a schematic diagram illustrating a third exemplary server consistent with various embodiments of the present disclosure.

FIG. 8 is a schematic diagram illustrating a third exemplary server consistent with various embodiments of the present disclosure. As shown in FIG. 8, on the basis of the first exemplary server shown in FIG. 6, the third exemplary server may further include an image acquisition control module 27 configured to send server control instructions to the lighting controller of the LED lighting device. The server control instruction may include an access control activation time, so that the lighting controller 12 may activate the image acquisition control module 27 when the access control activation time is reached.

Further, the exemplary server may also include a time configuration module 28 configured to receive an access control activation time from a user's mobile terminal, and/or perform statistical analysis on user's behaviors and habits to determine an access control activation time based on use input or the results of the statistical analysis.

The exemplary server may control the activation time period of the image acquisition module. In an exemplary embodiment, the time configuration module 28 may receive an access control activation time from a user's mobile terminal, and/or perform statistical analysis on user's behavior and habits to determine an access control activation time based on results of the statistical analysis. The image acquisition control module 27 may send server control instructions to the lighting controller. The server control instruction may include the access control activation time. The lighting controller may turn on the image acquisition module 13 when the access control activation time is reached. The access control activation time may be periodic times, and/or a periodic time durations.

Figure 9:
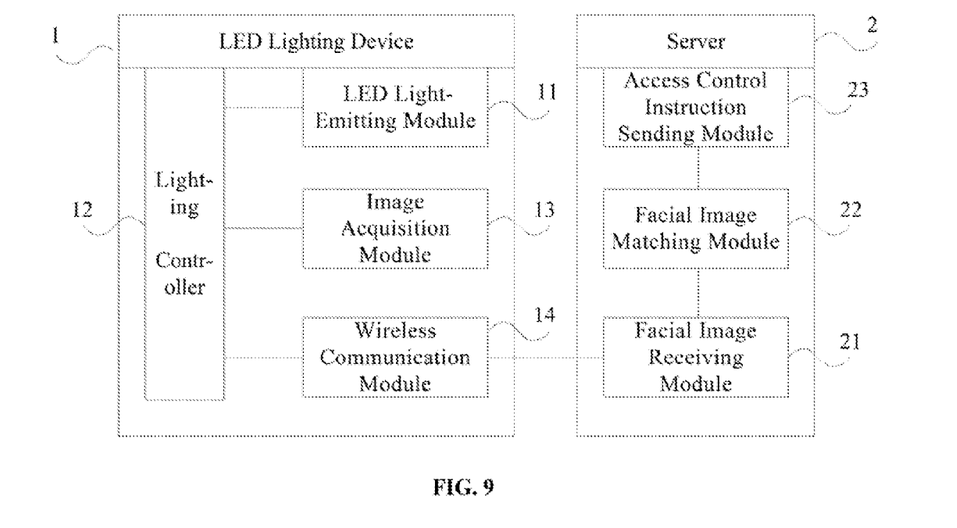
FIG. 9 is a schematic diagram illustrating an exemplary access control system consistent with various embodiments of the present disclosure.

FIG. 9 is a schematic diagram illustrating an exemplary smart gate system consistent with various embodiments of the present disclosure. As shown in FIG. 9, the exemplary smart gate system may include an LED lighting device 1 and a server 2. The LED lighting device 1 may be installed outside an entrance door.

The LED lighting device 1 may include an LED light-emitting module 11, a lighting controller 12, an image acquisition module 13 and a wireless communication module 14. The LED light-emitting module 11 provides illumination for a work space or a living space.

The server 2 may include a facial image receiving module 21, a facial image matching module 22 and an access control instruction sending module 23.

The image acquisition module 13 may be configured to collect a facial image of a person outside the entrance door, and send the collected facial image to the lighting controller 12.

The lighting controller 12 may be configured to control the LED light-emitting module 11 to emit light, and to send the facial image to the wireless communication module 14.

The wireless communication module 14 may be configured to send the facial image to the server 2.

The facial image receiving module 21 may be configured to receive facial images sent from the wireless communication module 14 of the LED lighting device 1. The LED lighting device 1 may be installed outside an entrance door.

The facial images may be facial images of persons outside the entrance door collected by the image acquisition module 13 of the LED lighting device 1.

The facial image matching module 22 may be configured to match the facial images with facial feature templates pre-stored by a user.

The access control instruction sending module 23 may be configured to send a door-opening instruction to the entrance door when a successful match is found.

The exemplary smart gate system may be formed by the LED lighting device shown in FIG. 1 and the server shown in FIG. 6. The implementation principles and technical advantages are similar to those in the relevant embodiments and will not be repeated here.

Further, the LED lighting device 1 may adopt any structure in various embodiments according to FIGS. 2-5, or a combination thereof. The server 2 may adopt any structure in various embodiments according to FIGS. 7-8, or a combination thereof. The implementation principles and technical advantages are similar to those in the relevant embodiments and will not be repeated here.

Figure 10:
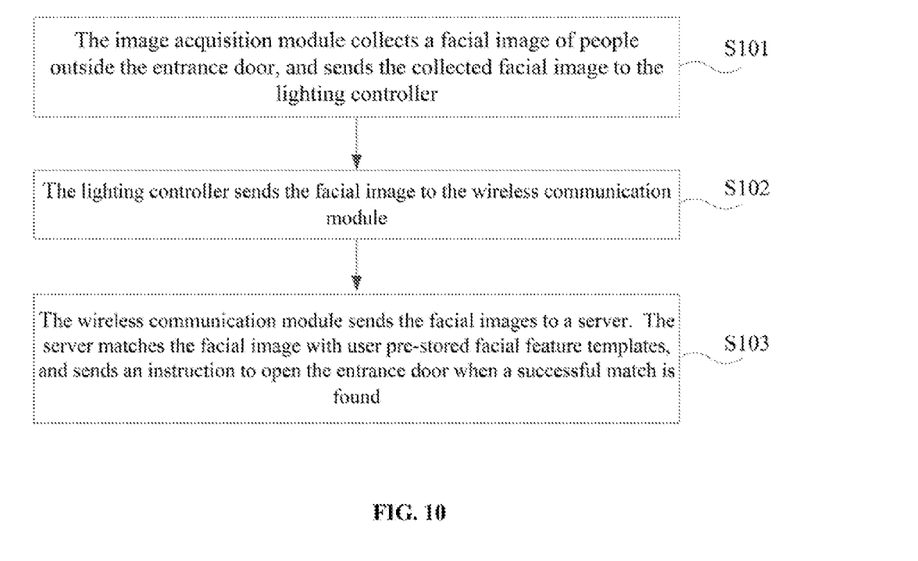
FIG. 10 is a flow chart illustrating a first exemplary access control method consistent with various embodiments of the present disclosure.

FIG. 10 is a flow chart illustrating a first exemplary access control method consistent with various embodiments of the present disclosure. As shown in FIG. 10, the exemplary method may be implemented by an LED lighting device. The LED lighting device may be installed outside an entrance door and may adopt a structure shown in FIG. 1.

The exemplary method may include the following steps.

In step S101, the image acquisition module may collect a facial image of people outside the entrance door, and send the collected facial image to the lighting controller.

In step S102, the lighting controller may send the facial image to the wireless communication module.

In step S103, the wireless communication module may send the facial images to a server. The server may match the facial image with user pre-stored facial feature templates, and send an instruction to open the entrance door when a successful match is found.

The exemplary method may adopt approaches described in various embodiments of the LED lighting device shown in FIG. 1. The implementation principles and technical advantages are similar to those in the relevant embodiments and will not be repeated here.

Further, the exemplary method may be implemented by the LED lighting devices shown in FIGS. 2-5. The exemplary method may further include the following step.

A power supply module of the LED lighting device may obtain alternative current (AC) signals from a utility line, convert the AC signals to four direct current (DC) signals, and send the four DC signals to the lighting controller, the LED light-emitting module, the image acquisition module and the wireless communication module.

In certain embodiments, before step S101, the exemplary method may further include the following steps.

A sound sensor of the LED lighting device may detect sound outside the entrance door, and send light control instructions to the lighting controller when the detected sound exceeds a preset threshold.

The lighting controller may activate the image acquisition module according to the light control instructions.

In certain embodiments, before step S101, the exemplary method may further include the following steps.

A user instruction processing module of the LED lighting device may receive a user control instruction from a mobile terminal of an indoor user through the wireless communication module, and send the user control instruction to the lighting controller. The user control instruction may be sent after the indoor user hears a door bell.

The lighting controller may activate the image acquisition module according to the user control instruction.

In certain embodiments, before step S101, the exemplary method may further include the following steps.

A server instruction processing module of the LED lighting device may receive a server control instruction from a server through the wireless communication module, and send the server control instruction to the lighting controller. The server control instruction may include an access control activation time.

The lighting controller may turn on the image acquisition module when the access control activation time is reached.

The exemplary method may adopt the approaches described in various embodiments of the LED lighting devices shown in FIGS. 2-5. The implementation principles and technical advantages are similar to those in the relevant embodiments and will not be repeated here.

Figure 11:
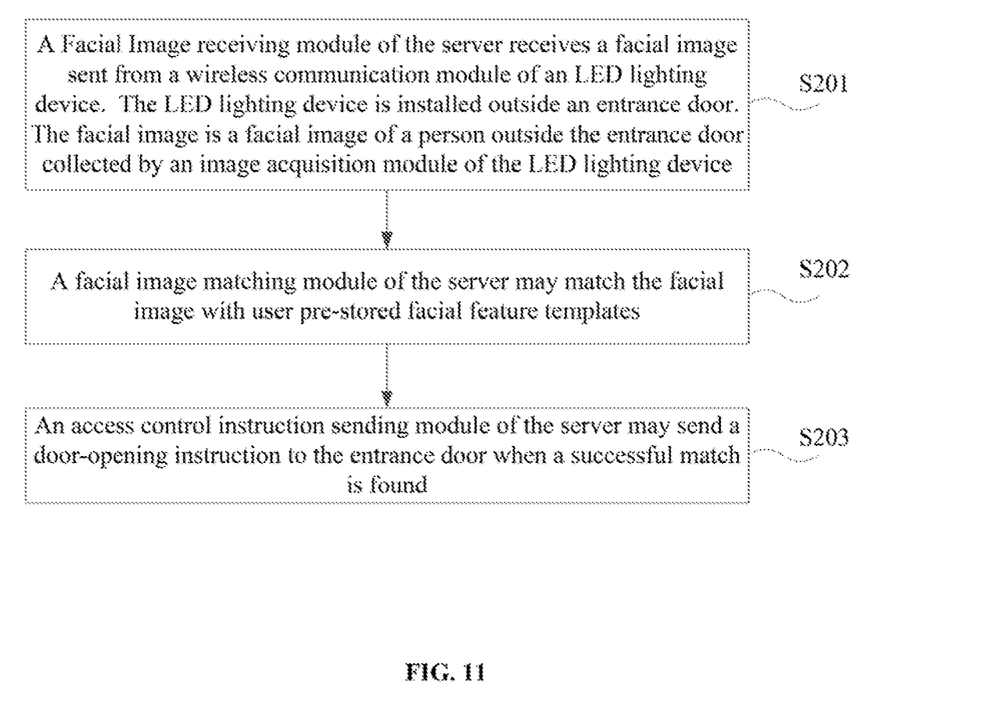
FIG. 11 is a flow chart illustrating a second exemplary access control method consistent with various embodiments of the present disclosure.

FIG. 11 is a flow chart illustrating a second exemplary access control method consistent with various embodiments of the present disclosure. As shown in FIG. 11, the second exemplary method may be implemented by a server. The server may adopt a structure shown in FIG. 7.

The second exemplary method may include the following steps.

In step S201, a facial image receiving module of the server may receive a facial image sent from a wireless communication module of an LED lighting device. The LED lighting device may be installed outside an entrance door. The facial image may be a facial image of a person outside the entrance door collected by an image acquisition module of the LED lighting device.

In step S202, a facial image matching module of the server may match the facial image with user pre-stored facial feature templates.

In step S203, an access control instruction sending module of the server may send a door-opening instruction to the entrance door when a successful match is found.

The exemplary method may adopt the approaches described in various embodiments of the server shown in FIG. 6. The implementation principles and technical advantages are similar to those in the relevant embodiments and will not be repeated here.

Further, the exemplary method may be implemented using the exemplary servers shown in FIGS. 7-8. The exemplary method may further include one or more of the following steps.

An appliance instruction processing module of the server may send an activation instruction to an appliance inside the entrance door when facial image match is successful.

A user notification module of the server may send a notification to a user's mobile terminal that a child has arrived the house, when the facial image successfully matches a pre-stored facial feature template of the child.

A user interaction module of the server may send a facial image to the user's mobile terminal when no match is found, and receive feedback information from the mobile terminal. Further, when the feedback information is granting access, the server may instruct the entrance door to open.

In certain embodiments, before step S201, the exemplary method may further include the following steps.

A time configuration module of the server may receive an access control activation time from a user's mobile terminal, and/or perform statistical analysis on user's behaviors and habits to determine an access control activation times based on results of the statistical analysis.

An image acquisition control module of the server may send server control instructions to the lighting controller of the LED lighting device. The server control instruction may include an access control activation time, so that the lighting controller may activate the image acquisition module of the LED lighting device when the access control activation time is reached.

In various embodiments, the LED lighting device may integrate the image acquisition module, the wireless communication module, and other modules described in FIGS. 1-5 into one device. The LED lighting device with the integrated modules may be installed outside the entrance door. The image acquisition module may collect a facial image and send the facial image to the server through the wireless communication module. The server may implement facial recognition technologies, and match the collected facial image with pre-stored facial feature templates. When a similarity rate between the collected facial image and a pre-stored facial feature template exceeds a preset match threshold (i.e. a successful match is found), the server may send an instruction to open the entrance door. The LED lighting device and the server may form an intelligent access control system, which enhances home security. Further, the image acquisition module is integrated in the LED lighting device, which is not easy to notice. A visitor may think it is an ordinary hallway or porch light. Such configuration may lower the chance for a visitor to spot and damage the home access control system, which further enhances home security.

In some embodiments, the LED lighting device may be connected to one or more other lighting devices in the building. The LED lighting device may have the capacity to control the one or more other lighting devices. The LED lighting device may determine that the facial images collected by the image acquisition module do not match any facial template of allowed visitors. The LED lighting device may send a user notification to one or more designated users. When a user determined that the facial images collected by the image acquisition module indicates an unwanted visitor, the user may send user instructions to flash the lights (or change light colors) in the LED lighting device and/or the lights in the one or more other lighting devices that are connected to the LED light device.

In some embodiments, the LED lighting device may include a speaker module. The speaker module may be controlled by the lighting controller, and may send and receive data through the wireless communication module. An exemplary LED lighting device with an integrated speaker module is described in U.S. Patent Application No. 20140270264, the content of which is incorporated f by reference. When a user has determined that the facial images collected by the image acquisition module indicate an unwanted visitor, the user may send user instructions to turn on the speaker module integrated into the LED lighting device. The lighting controller may then use the speaker module to broadcast a message, requesting the user to leave the premises. The smart home access system consistent with the present disclosure may further combine the use of the warning lights (of the LED lighting device and any connected lights) with the audio warning message (through the speaker module of the LED lighting device) to keep away unwanted visitors.

It should be noted that, various embodiments may be implemented by software, hardware and/or a combination of software and hardware. For example, various modules in the present disclosure may adopt application-specific integrated circuit (ASIC) or other similar hardware apparatus for implementation. In one embodiment, software programs in the present disclosure may implement previously described steps or functions through a processor. Further, software programs in the present disclosure (including related data structures) may be stored to a computer-readable recording medium, e.g., RAM memory, magnetic or optical drive or a floppy disk and the like. Moreover, some steps or functions in the present disclosure may be implemented by hardware. For example, various circuits may accommodate with the processor and perform various functions and steps.

It should be understood that, the word "include" does not exclude other units or steps. A singular form does not exclude a plural form. Various units/modules/devices described in a system claim may be implemented by one unit/module/device through hardware and/or software. Words such as "first" and "second" are used to indicate names, and do not indicate any specific order.

It should be understood by ordinary people skilled in the art that, all steps or some steps in various method embodiments may be implemented by using programs to instruct related hardware. The programs may be stored in a computer-readable storage medium. Executing the programs may realize previously described steps in various method embodiments. The computer-readable storage medium may include ROM, RAM, disk, or other medium that can store program code.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides an intelligent smart gate system including an LED lighting device installed outside an entrance door and a server. The LED lighting device may include an LED light-emitting module, a lighting controller, an image acquisition module and a wireless communication module. The server may include a facial image receiving module, a facial image matching module, and an access control instruction sending module. It is noted that the various modules may be included in the LED lighting device or the serve depending on the configurations of each embodiment. For example, in one embodiment, the a facial image receiving module, a facial image matching module, and an access control instruction sending module may be integrated in the LED lighting device.

The lighting controller of the LED lighting device may control the image acquisition module and the wireless communication module. The image acquisition module may collect a facial image of a person outside the entrance door and send the collected facial image to the lighting controller. The lighting controller may send the collected facial image to a server through the wireless communication module for facial recognition. The server may implement facial recognition technologies, match the collected facial image with pre-stored facial feature templates, and send an instruction to open the entrance door when a successful match is found.

In order to save energy, the image acquisition module may be off when idling. In one embodiment, the LED lighting device may further include a sound sensor to detect sounds outside the entrance door. When the sound sensor detects sound levels that exceed a preset threshold, it may send light control instructions to the lighting controller. The lighting controller may then activate the image acquisition module according to the light control instructions. Further, the lighting controller may also control the LED light-emitting module to light up (e.g., increasing brightness level) nearby areas of the entrance door, which allow the image acquisition module to collect clearer facial images. The LED lighting device may also change its orientation to provide better lighting for collecting facial images. This approach may enhance the accuracy of the facial recognition results.

In another embodiment, the LED lighting device may further include a user instruction processing module. When there is someone outside ringing the doorbell and an owner hears the doorbell inside the house, the owner may use the mobile terminal to send a user control instruction to the user instruction processing module through the wireless communication module. Further, the user instruction processing module may send the user control instruction to the lighting controller which may follow the user instruction and turn on the image acquisition module. For example, the user instructions may control the LED light-emitting module to light up (e.g., increasing brightness level) nearby areas of the entrance door, which allow the image acquisition module to collect clearer facial images. The user instructions may also change the orientation of the LED lighting device to provide better lighting for collecting facial images.

Further, the lighting controller may determine whether to send the images to the server for facial image matching by detecting whether the images collected by the image acquisition module have changed or not. This process may save data communication resources between the LED lighting device and the server.

The server may further include an appliance instruction processing module. When the server determines that a family member is entering the house, the appliance instruction processing module may send control instructions to electrical appliances inside the entrance door. Therefore, the electrical appliances in the house may be adjusted to a preset working mode, which creates a smart home living experience. Users may customize the preset working modes according to personal needs, such as turning on a living room light, activating a cooling mode of an air-conditioner, closing electrical shades/curtain, etc.

Further, the server may include a user notification module. When determining a child is entering after face matching, the server may send a notification to the user through the user notification module that the child has arrived home. In certain embodiments, the mobile terminal may be a mobile phone owned by a father and/or a mother in the family. In this way, parents may know when their kids get home, which enhances security controls for family members.

In addition, the exemplary server may include a user interaction module. When a guest visits the place but his/her facial feature template is not pre-stored, no match would be found. The user interaction module may send a facial image of the guest to the user's mobile terminal. Whether being at home or not, the user may conveniently decide whether the guest is an allowed visitor on the mobile terminal, and send feedback information through the mobile terminal to the server. When the feedback information is granting access, the user interaction module may send a door-opening instruction to the entrance door.

The server may also control an activation time period of the image acquisition module. The server may further include a time configuration module and an image acquisition control module. The time configuration module may receive an access control activation time from a user's mobile terminal, and/or perform statistical analysis on user's behavior and habits to determine an access control activation time based on results of the statistical analysis. The image acquisition control module may send server control instructions to the lighting controller. The lighting controller may turn on the image acquisition module when the access control activation time is reached. The access control activation time may be a periodical time period, and/or an aperiodic time periods.

Comparing to using conventional door locks as an anti-theft measure, the smart light and home access system consistent with the present disclosure may increase security and intelligent levels of houses and work places. Further, the image acquisition module is integrated in the LED lighting device, which is makes it less noticeable. A visitor may think it is an ordinary hallway or porch light. Such configuration may lower the chance for a unwanted visitor to spot and damage the access control system, which may further enhance the home security level.

What is claimed is:

1. An LED lighting device installed in a smart access system, comprising:
   a lighting controller;
   a wireless communication module coupled to the lighting controller;
   an LED light-emitting module coupled to the lighting controller, configured to emit light based on a light control instruction received from the lighting controller;
   an image acquisition module coupled to the lighting controller, configured to collect surrounding images in an area illuminated by the LED lighting device; and
   a server instruction processing module coupled to the lighting controller, configured to receive a server control instruction from the server through the wireless communication module, and send the server control instruction to the lighting controller, wherein:
   the lighting controller is configured to send a light control instruction to activate the image acquisition module, receive the surrounding images captured by the image acquisition module to determine whether the surrounding images have changed, and in response to a change of the surrounding images, send the surrounding images to the wireless communication module;
   the wireless communication module is configured to send the surrounding images to a server, wherein the server matches the surrounding images with user pre-stored facial feature templates and sends an instruction to open an entrance door when a successful match is found; and
   the server control instruction includes an access control activation time; and
   the lighting controller is further configured to turn on the image acquisition module when the access control activation time is reached.

2. The LED lighting device according to claim 1, further comprising:
   a power supply module configured to obtain alternative current (AC) signals from a utility line, convert the AC signals to four direct current (DC) signals, and send the four DC signals to the lighting controller, the LED light-emitting module, the image acquisition module and the wireless communication module, respectively.

3. The LED lighting device according to claim 1, further comprising:
   a sound sensor coupled to the lighting controller, configured to detect sound surrounding the area illuminated by the LED lighting device, and send a light control instruction to the lighting controller when the detected sound exceeds a preset threshold;
   wherein: the lighting controller is further configured to transmit the light control instruction to activate the image acquisition module.

4. The LED lighting device according to claim 1, further comprising:
   a user instruction processing module coupled to the lighting controller, configured to receive a user control instruction from a mobile terminal through the wireless communication module, and to send the user control instruction to the lighting controller;
   wherein: the lighting controller is further configured to send the user control instruction to activate the image acquisition module.

5. A smart access system using one or more LED lighting devices, comprising:
   an LED lighting device installed in an area to be illuminated, the LED lighting device including an LED light-emitting module, a lighting controller, an image acquisition module, a wireless communication module and a server instruction processing module, wherein the LED light-emitting module, the image acquisition module, and the server instruction processing module, and the wireless communication module are coupled to the lighting controller respectively; and
   a server in communication with the wireless communication module of the LED lighting device, including a facial image receiving module, a facial image matching module, an access control instruction sending module, and an image acquisition control module;
   wherein:
   the image acquisition module is configured to collect surrounding images in an area illuminated by the LED lighting device, wherein:
   the lighting controller is configured to send a light control instruction to activate the image acquisition module, receive the surrounding images captured by the image acquisition module to determine whether the surrounding images have changed, and in response to a change of the surrounding images, send the surrounding images to the wireless communication module;
   the wireless communication module is configured to send the surrounding images to the server;
   the facial image receiving module is configured to receive the surrounding images through the wireless communication module;
   the facial image matching module is configured to match the surrounding images with user pre-stored facial feature templates;
   the access control instruction sending module is configured to send a door-opening instruction to a door when a successful match is found;
   the image acquisition control module of the server is configured to send a server control instruction to the lighting controller, the server control instruction including an access control activation time;

the server instruction processing module is configured to receive the server control instruction from the image acquisition control module of the server through the wireless communication module, and send the server control instruction to the lighting controller; and the lighting controller is further configured to turn on the image acquisition module when the access control activation time is reached.

6. The smart access system according to claim 5, wherein:
the LED lighting device further includes a power supply module configured to obtain AC signals from a utility line, convert the AC signals to four DC signals, and send the four DC signals to the lighting controller, the LED light-emitting module, the image acquisition module and the wireless communication module.

7. The smart access system according to claim 5, wherein:
the LED lighting device further includes a sound sensor coupled to the lighting controller, configured to detect sound outside an entrance door, and send a light control instruction to the lighting controller when the detected sound exceeds a preset threshold; and
the lighting controller is further configured to transmit the light control instruction to activate the image acquisition module.

8. The smart access system according to claim 5, wherein:
the LED lighting device further includes a user instruction processing module coupled to the lighting controller, configured to receive a user control instruction from a mobile terminal through the wireless communication module, and to send the user control instruction to the lighting controller; and
the lighting controller is further configured to send the user control instruction to activate the image acquisition module.

9. The smart access smart gate system according to claim 5, wherein the server further includes a time configuration module configured to:
receive the access control activation time from a user's mobile terminal, or
perform statistical analysis on users' behaviors and habits to determine the access control activation time based on results of the statistical analysis.

10. The smart access smart gate system according to claim 5, wherein:
the server further includes an appliance instruction processing module configured to send an activation instruction to an electrical appliance when a successful match is found.

11. The smart access system according to claim 5, wherein:
the server further includes a user notification module configured to send a notification to a user's mobile terminal that a child has arrived, when the surrounding images successfully-match a pre-stored facial feature template of the child.

12. The smart access system according to claim 5, wherein: the server further includes a user interaction module configured to:
send a facial image obtained from the surrounding images to the user's mobile terminal when no match is found;
receive feedback information from the mobile terminal; and
when the feedback information is granting access, instruct the door to open.

13. An access control method implemented by an LED lighting device with an integrated LED light-emitting module, an integrated lighting controller, an integrated image acquisition module, an integrated wireless communication module, and a server instruction processing module coupled to the lighting controller, the method comprising:
activating the image acquisition module by a light control instruction issued by the lighting controller;
collecting, by the image acquisition module, surrounding images in an area illuminated by the LED lighting device;
sending, by the image acquisition module, the surrounding images to the lighting controller;
determining, by the lighting controller, whether the surrounding images have changed;
sending, by the lighting controller, the surrounding images to the wireless communication module in response to a change of the surrounding images;
sending, by the wireless communication module, the surrounding images to a server;
matching, by the server, the surrounding images with user pre-stored facial feature templates;
sending, by the server, an instruction to open the entrance door when a successful match is found;
receiving, by the server instruction processing module, a server control instruction from the server through the wireless communication module, and sending the server control instruction to the lighting controller, the server control instruction including an access control activation time; and
turning on, by the lighting controller, the image acquisition module when the access control activation time is reached.

14. The LED lighting device according to claim 1, wherein: the lighting controller is further configured to save communication data between the lighting controller and the sever.

15. The LED lighting device according to claim 3, wherein: the lighting controller is configured to transmit the light control instruction to the LED light-emitting module to emit light.

16. The LED lighting device according to claim 4, wherein: the lighting controller is further configured to receive the user control instruction to adjust a brightness level and an orientation of the LED light-emitting module to provide sufficient light to the image acquisition module being activated by the user control instruction.

17. The smart access system according to claim 7, wherein: the lighting controller is configured to transmit the light control instruction to the LED light-emitting module to emit light.

* * * * *